United States Patent [19]

Chan et al.

[11] Patent Number: 4,653,085
[45] Date of Patent: Mar. 24, 1987

[54] TELEPHONE SWITCHING SYSTEM ADJUNCT CALL PROCESSING ARRANGEMENT

[75] Inventors: Norman C. Chan, Louisville; Leif K. Pederson, Thornton, both of Colo.

[73] Assignees: AT&T Company; AT&T Information Systems Inc., both of Holmdel, N.J.

[21] Appl. No.: 654,885

[22] Filed: Sep. 27, 1984

[51] Int. Cl.$^4$ .................. H04M 3/50; H04M 3/58; H04M 11/00; H04Q 11/04
[52] U.S. Cl. .................................. 379/94; 370/58; 379/212; 379/213
[58] Field of Search ............... 370/58, 62, 110.1, 61; 179/18 ES, 18 BE, 18 AD, 2 DP, 2 A, 27 FH, 27 FG, 18 B, 18 BD, 18 BC

[56] References Cited

U.S. PATENT DOCUMENTS

| | | | |
|---|---|---|---|
| 4,112,258 | 9/1978 | Alles | 370/58 |
| 4,388,718 | 6/1983 | Gerke et al. | 370/110.1 |
| 4,397,030 | 8/1983 | Becker et al. | 375/36 |
| 4,413,337 | 11/1983 | Dauphin et al. | 370/58 |
| 4,488,287 | 12/1984 | Carter et al. | 370/58 |
| 4,527,012 | 7/1985 | Caplan et al. | 179/18 ES |
| 4,534,023 | 8/1985 | Peck et al. | 370/58 |
| 4,546,468 | 10/1985 | Christmas et al. | 370/454 |
| 4,551,832 | 11/1985 | Carll et al. | 370/58 |

OTHER PUBLICATIONS

"Design of a Multi—Service Subscriber Loop System", T. Tsuda et al., NTG—Fachber (Germany), vol. 73, (1980), pp. 114–118.

"Data Communications in MD 110", G. Baruicoat et al., *Ericsson Review*, No. 2, 1982, pp. 67–75.

"Frame—Mode Customer Access to Local Integrated Voice and Data Digital Networks", *IEEE* 1979 *International Conference on Communications*, N. Accarino et al, Jul. 1979, pp. 38.5/1–7.

*Primary Examiner*—Thomas w. Brown
*Attorney, Agent, or Firm*—James M. Graziano

[57] ABSTRACT

The adjunct call processing arrangement of our invention eliminates the separation between hard-wired telephone switching system computer facilities and customer owned switchably connectable computer facilities. A general purpose communication interface is provided which connects the customer provided computer facilities to both the switching network and the hard-wired system processor of the telephone switching system via the standard telephone switching system port circuit. This general purpose communication interface enables a customer provided computer facility to provide additional call processing capability. In particular, the attendant services call processing subroutines and the directory assistance data base and software are provided on the computer facility. The telephone switching system routes all attendant-directed calls to a telephone station set associated with the computer and transmits call related data to the computer. The computer performs the necessary call processing and transmits a message back to the telephone switching system to indicate the switching system operation necessary to provide the requested service.

13 Claims, 11 Drawing Figures

Microfiche Appendix Included
(5 Microfiche, 361 Pages)

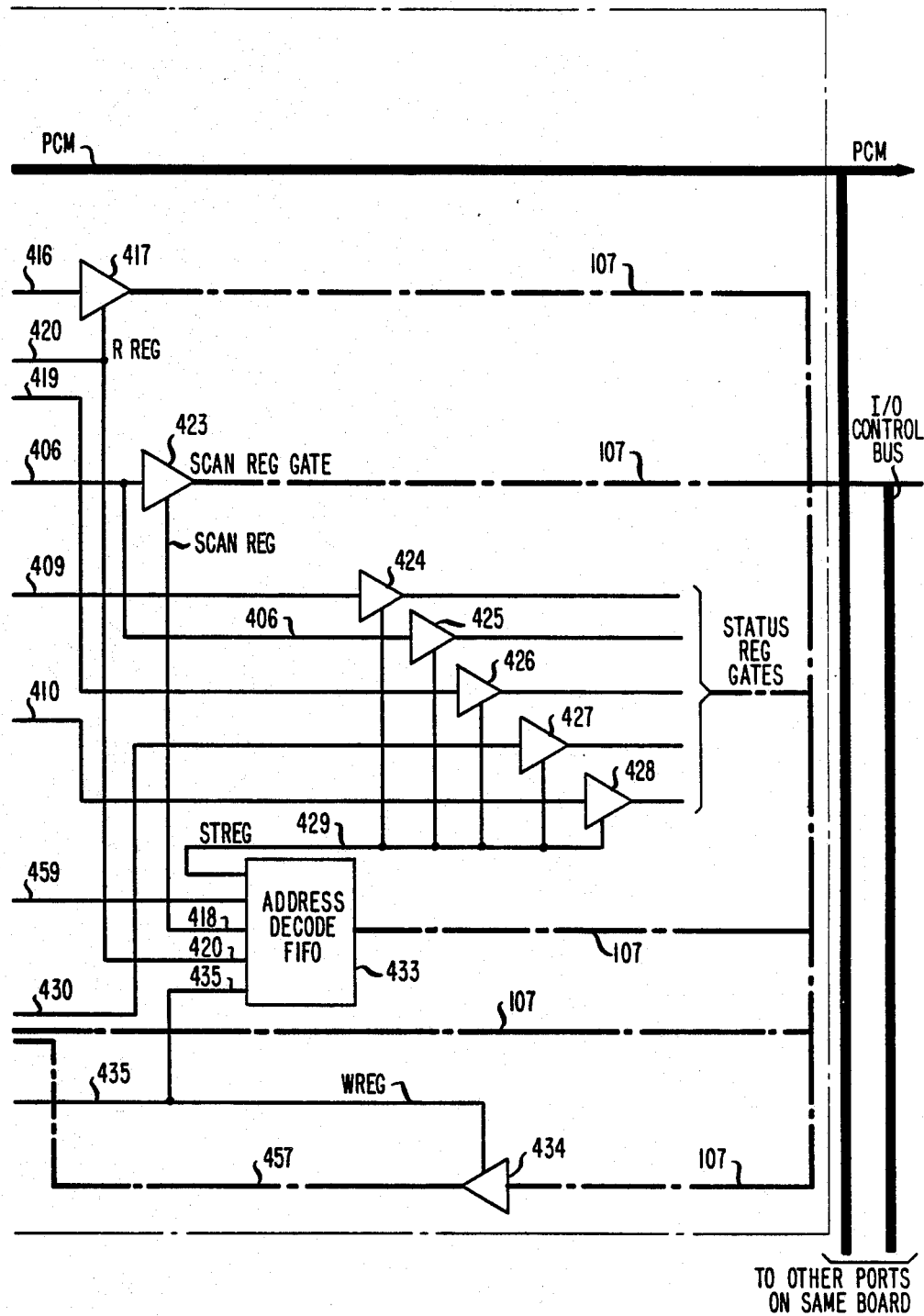

FIG. 8
DCP FRAME FORMAT

| F<br>3 BITS | S<br>1 BIT | $I_1$<br>8 BITS | $I_2$<br>8 BITS |
|---|---|---|---|

FIG. 9
HDLC FRAME FORMAT

| FLAG<br>01111110<br>1 BYTE | ADDRESS<br>1 BYTE | CONTROL<br>1 BYTE | I<br>INFORMATION<br>0-16 BYTES | CHECK<br>SEQUENCE<br>2 BYTES | FLAG<br>01111110<br>1 BYTE |
|---|---|---|---|---|---|

DIRECTORY ASSISTANCE    BUSY    SPEED CALL

| NAME | EXT | LOC | DEPT |
|---|---|---|---|
| G. R. SAGER | 4872 | 30L19 | 500-02122 |
| P. F. SAGER | 3724 | 30L31 | 500-02122 |
| F. J. BOYLE | 4145 | 30L31 | 500-02122 |
| L. K. PEDERSON | ■ | | |

M. A. FLAVIN
T. G. LEWIS
W. T. O'SHEA
T. M. QUINN
G. E. SALTUS
L Z
F J
OUTSIDE
WEATHER

APPEARANCE STATUS

| CALLING | CALLED | EXT | STAT | TIME |
|---|---|---|---|---|
| OUTSIDE | | | | |
| L. K. PEDERSON | | | TALK | 0:20 |
| OUTSIDE | D. C. FOGG | 4938 | RING | 0:12 |
| K. MART | C. M. SHUB | 3922 | HOLD | 0:10 |
| M. A. FLAVIN | N. C. CHAN | 3664 | HOLD | 1:03 |
| | | | HOLD | 1:01 |
| | | | IDLE | |
| | | | IDLE | |

> ENTER OUTSIDE NUMBER TO DIAL:

TELEPHONE SWITCHING SYSTEM ADJUNCT CALL PROCESSING ARRANGEMENT

REFERENCE TO A MICROFICHE APPENDIX

This application contains a set of microfiche appendices, designated A and B, listing programs incorporated in the subject system comprising the subject matter of this disclosure. The total number of microfiche is 5 and the total number of frames is 361.

CROSS-REFERENCE TO RELATED APPLICATIONS

The following U.S. application, which is assigned to the same assignee as the instant application and filed concurrently therewith, has related subject matter:

(1) "Telephone Switching System Switch Processor Interface", Ser. No. 654,888 by N. C. Chan and L. K. Pederson.

FIELD OF THE INVENTION

This invention relates to the use of customer provided computer facilities to perform call processing tasks in a stored program controlled telephone switching system. The customer provided computer is connected via an interface circuit to any communication pair in the telephone switching system which enables the customer provided computer to communicate with the telephone switching system processor via the port circuit. The customer provided computer can be used to implement real-time intensive call processing tasks such as attendant console/directory assistance.

BACKGROUND OF THE INVENTION

Stored program controlled telephone switching systems are used to interconnect telephone station sets as well as digital terminals, personal computers and large main-frame computers. The telephone switching system establishes communication connections between these computer facilities in a manner analogous to voice communications connections between subscribers who are using analog telephone station sets. The computer facilities are connected to communication pairs of the telephone switching system by modems. A standard telephone station set is also connected to the communication pair and is used to originate a call to a destination computer facility. As a result of the call origination, a communication connection is established through the switching network from the originating telephone station set to the destination computer facility. The user then switches the modem on line and the modem converts the digital signals output by the computer facility to analog signals which are transmitted by the switching network to a modem associated with the destination computer facility. The destination modem converts the received analog signals to digital signals for use of the destination computer facility. Thus, the telephone switching system simply provides a communication path between two designated end points which, in this case, are connected to computer facilities.

The stored program controlled telephone switching system uses computers to govern its operation. A system processor or a number of system processors operating in synchronization are hard-wired into the telephone switching system to control call establishment and switching network operation. Telephone switching systems also make frequent use of hard-wired microprocessors to perform low level time consuming tasks such as line scanning, protocol conversion, etc. thereby freeing the system processor to implement the high level call processing routines.

There is a clear separation between these two computer environments. In one situation, computers are hard-wired into the telephone switching system to realize fixed telephone switching system control functions while in the other situation the telephone switching system interconnects customer owned computer facilities in a fashion analogous to the interconnection of analog station sets.

SUMMARY OF THE INVENTION

The adjunct call processing arrangement of our invention eliminates this separation between hard-wired telephone switching system computer facilities and the customer owned switchably connectable computer facilities. A general purpose communication interface is provided which connects the customer provided computer facilities to both the switching network and the hard-wired system processor of the telephone switching system via the standard telephone switching system port circuit. This general purpose communication interface enables a customer provided computer facility to provide additional call processing capability.

In particular, the attendant services call processing subroutines and the directory assistance data base and software are provided on the computer facility. The telephone switching system routes all attendant-directed calls to a telephone station set associated with the computer and transmits call related data to the computer. In response to this call related data, the computer performs the necessary call processing and transmits a message back to the telephone switching system to indicate the switching system operation necessary to provide the requested service.

The telephone switching system is equipped with port circuits which provide an interface to the switching system for the terminal equipment. These port circuits transmit and receive a baseband signal on the communication leads that multiplexes voice, data and control signals. The telephone switching system routes the voice and data components of this signal through the switching network to other port circuits and thence to the associated terminal equipment. The control component of this signal is routed through a control signalling channel to the system processor of the telephone switching system.

These port circuits presently provide only a limited control signalling channel communication capability. The terminal equipment transmit and receive only call setup information such as on/off hook, dialing, ringing, button and lamp status.

The present invention makes use of a general purpose communication interface which provides access to this existing control signalling channel capability of the telephone switching system to establish a communication path between a computer connected to the communication leads and the system processor as well as the existing voice communication path to the switching network of the telephone switching system. The computer and an associated voice instrument can be connected to any communication leads in the telephone switching system via this general purpose communication interface. The computer can communicate directly with the system processor of the telephone switching system to thereby provide new features and services, or additional call processing capability for the telephone switching system.

An example of this adjunct call processing capability is that call processing subroutines and their associated data bases (such as attendant console/directory assistance) can reside on the computer. The telephone switching system then operates in cooperation with the computer to process calls by way of appropriate signals communicated between the system processor and the computer over the control signalling channel. In the case of attendant console operation, the telephone switching system routes attendant-directed calls to the telephone station set served by the general purpose communication interface associated with the computer and concurrently transmits call control information to the computer over the control signalling channel. The "operator" at the computer receives the call on the associated telephone station set as the computer concurrently receives the appropriate attendant call related data. This enables the operator at the computer to provide, for example, a combined attendant console/directory assistance function. The operator enters the name of the called party into the computer and the computer uses the directory assistance data base to identify the station number of the called party. The computer then automatically generates a call transfer request message. The call transfer request message is transmitted via the control signalling channel to the system processor which activates the switching network to transfer the call. The computer thereby relieves the telephone switching system system processor of the burden of providing this real-time intensive task and also integrates what is now two discrete functions: directory assistance and attendant services.

This adjunct call processing arrangement provides additional flexibility to the customer since the computer can be connected to any standard set of communication leads in the telephone switching system. Thus, in the above attendant call processing example any employee at any location at any time can provide the attendant console/directory assistance function without requiring dedicated wiring as is the problem with existing attendant console arrangements in telephone switching systems.

BRIEF DESCRIPTION OF THE DRAWING

FIGS. 4-6 depict the details of the telephone switching system port circuit;

FIG. 7 illustrates the method of arranging FIGS. 4-6;

FIG. 8 depicts the details of the DCP message frame format;

FIG. 9 depicts the details of the HDLC message frame;

FIG. 11 illustrates a typical display on the CRT of the computer facility.

DETAILED DESCRIPTION OF THE DRAWING

Figure 1:
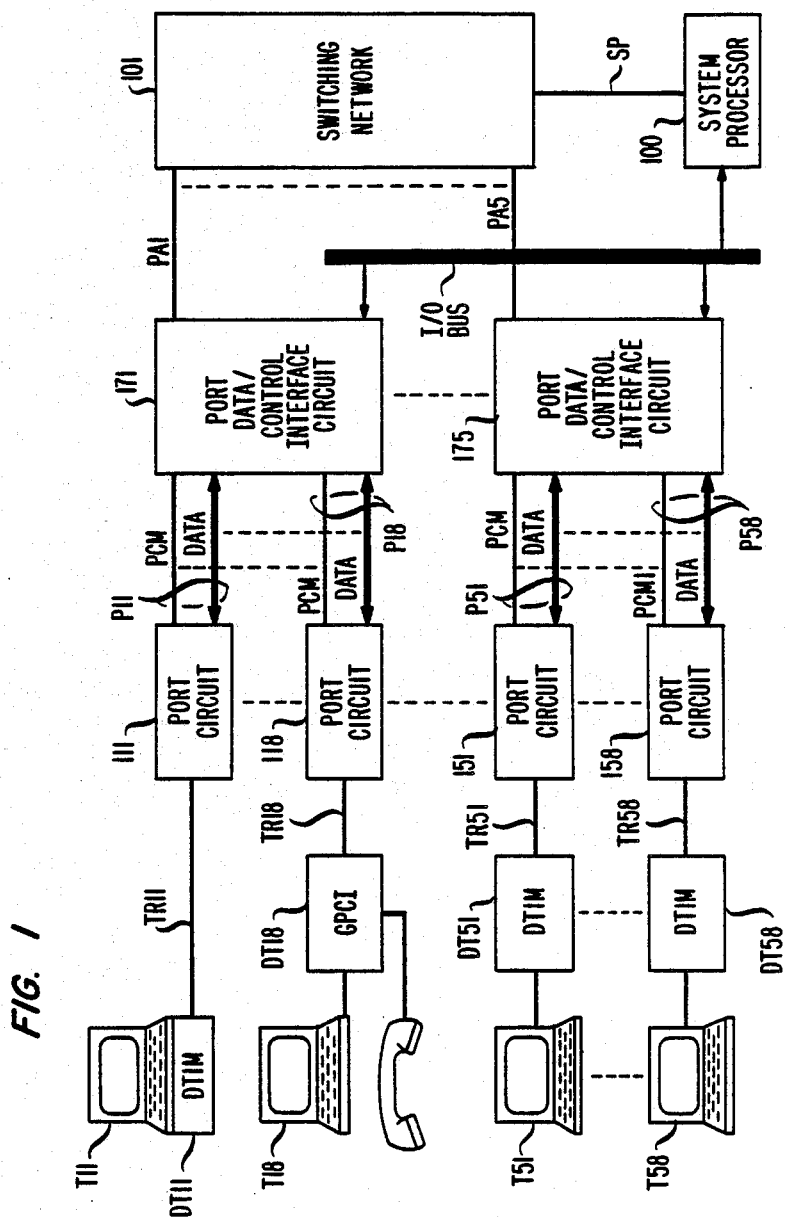
FIG. 1 illustrates in block diagram form, the overall system structure of the subject telephone switching system.

The telephone switching system of this invention is illustrated in FIG. 1. This system includes a plurality of terminal equipment T11-T58 each of which is associated with a respective one of port circuits 111-158. This terminal equipment includes telephone station sets as well as digital terminal devices and computer facilities. A switching network 101, which comprises a time slot interchange circuit of the type illustrated in U.S. Pat. No. 4,112,258, issued to H. G. Alles, Sept, 5, 1978, is connected to a number of port data/control interface circuits 171-175. Each port data/control interface circuit (eg. 171) shown in FIG. 1 serves eight port circuits (111-118) and functions to interface these port circuits with switching network 101 as well as system processor 100. Switching network 101 operates under control of system processor 100 and establishes communication connections among the terminal equipment by interconnecting the associated port circuits 111-158.

TERMINAL EQUIPMENT

The standard digital terminal T11 generates an RS232 signal output which has a very limited transmission range. A digital terminal interface module (e.g.—DT11) is used to convert the RS232 signals output by digital terminal T11 to alternate bipolar modulated code signals which can be transmitted a significant distance over a set of communication leads TR11 to the port circuits 111 of the telephone switching system. The digital terminal interface module DT11 is either an integral part of the digital terminal or connected between the existing digital terminal T11 and the associated communication leads TR11. This digital terminal interface module is disclosed in detail in U.S. Pat. No. 4,532,377.

In addition to this signal conversion, digital terminal interface module DT11 uses a particular message frame format (DCP) to effect data transmission between port circuits such as 111 and their associated digital terminals such as T11. This DCP format consists of a framing bit and three fields: an S field that conveys control signalling data, and two I fields that convey information data (FIG. 8). This is a well-known data transmission format as described in the article by N. Accarino et al entitled, "Frame-Mode Customer Access to Local Integrated Voice and Data Digital Network" published in the Conference Report of the IEEE 1979 International Conference on Communications. In this DCP data transmission format, one of the I fields can be used for the transmission of PCM-encoded voice information while the other one (or both I fields) can be used for the transmission of either bulk or interactive data.

MESSAGE FORMAT

The terminal equipment served by the telephone switching system may be various types of equipment and the terminal equipment illustrated in FIG. 1 has concurrent voice and data transmission capability. In this system, all the terminal equipment which receive voice transmissions from the user convert the received analog voice signals into a set of digital data segments, each comprising an eight bit PCM-encoded voice sample. The terminal equipment which generates digital transmissions (such as keyboards) receive and originate digital data messages which are generally of length greater than eight bits. A typical format (HDLC) of these data messages is illustrated in FIG. 9, wherein each data message includes flag characters at the beginning and end of the data message; data, control and address fields; and a cyclic redundancy check field for error checking purposes.

SIGNALLING CHANNELS

This telephone switching system is equipped with two signalling channels which reflect the basic DCP message frame format used by the port circuits. In particular, a control signalling channel (S channel) conveys control messages (S field bits) between system processor 100 and terminal equipment T11-T58. The S channel extends from each terminal (such as T11) through associated digital terminal interface module (DTIM) DT11, communication leads TR11, port circuit 111, leads P11 and thence through port data/control interface circuit 171 to system processor 100 via I/O BUS. The switching system is also equipped with an information channel (I channel) which conveys information data (I field segments) such as the eight-bit PCM-encoded voice signals or bulk data (in eight-bit bytes) between switching network 101 and terminal equipment T11-T58. The I channel extends from each terminal (such as T11) through associated digital terminal interface module (DTIM) DT11, communication leads TR11, port circuit 111, leads P11 and thence through port data/control interface circuit 171 to switching network 101 via leads PA1.

Thus, the digital terminal and its associated digital terminal interface module multiplex the actual data transmissions (voice and data) with the control signals. This multiplexed signal is then transmitted over the communication leads to the associated port circuit where it is demultiplexed. The actual data transmission is switched in traditional fashion by the switching network to the designated destination and the control signals are forwarded to the system processor. Again, these control signals are the standard on-hook/off-hook status, button operation, lamp lighting, and ringing signals common to all telephone switching systems.

To effectively illustrate the structure and operation of the subject general purpose communication interface, the details of the existing port circuit and especially the S channel must first be explored.

I CHANNEL REALIZATION

System processor 100, in the course of connecting a calling digital terminal (T11) to a called digital terminal (T58), assigns a time slot in switching network 101 for the interconnection of digital terminals T11 and T58. Switching network 101 controls the data (I channel) transmissions between terminal equipment T11-T58. In particular, switching network 101 transmits each eight bit data segment received from digital terminal T58 to port circuit 111 via port data/control interface circuit 175. Port circuit 111 transmits each data segment so received to digital terminal T11 via digital terminal interface module (DTIM) DT11 and also receives a reply data segment from digital terminal T11 via DTIM DT11 for transmission to digital terminal T58. Port circuit 111 transmits the reply data segment received from DTIM DT11 to switching network 101 via port data/control interface circuit 171. Switching network 101 stores the received data segment, and interchanges the data segments received from digital terminal T11 and digital terminal T58 during the time slot assigned for this call. This action interconnects these digital terminals.

S CHANNEL REALIZATION

The control or S channel transmissions are controlled by system processor 100. System processor 100 periodically scans each port, trunk and service circuit connected to switching network 101 to find if there is a control message for system processor 100. During each such scan cycle, system processor 100 transmits timing, address and control information to port data/control interface circuits 171-175 via I/O BUS. Each port data/control interface circuit (ex. 171) has a multiplexer which interprets the signals received on I/O BUS during each scan cycle and determines whether the address signals transmitted thereon identify one of the port circuits (e.g. 111) served by that port data/control interface circuit (171). If such a match occurs during a scan cycle, port data/control interface circuit 171 enables the identified port circuit 111 to read the control message transmitted to port data/control interface circuit 171 by system processor 100.

Port circuit 111 reads the control message written into port/data control interface circuit 171 by system processor 100 and places the control message into a control message register (not shown) in port circuit 111. Port circuit 111 transmits this control message one bit at a time from the control message register to digital terminal interface module DT11 via communication leads TR11. Digital terminal interface module DT11 assembles these serial bits into commands for digital terminal T11. Digital terminal T11 responds to these commands by performing the indicated operation, such as lighting a lamp, producing an audible ring signal, etc.

If digital terminal T11 has no reply or other control message to send back to system processor 100, digital terminal interface module DT11 transmits idle bits back to port circuit 111. If digital terminal T11 has a control message to send to system processor 100, it is written into the control message register of port circuit 111 one bit at a time. Port circuit 111 sets a data-ready bit in its status register (not shown) to indicate to system processor 100 that a control message has arrived from digital terminal T11. System processor 100 periodically scans the port circuit status registers via I/O BUS and port data/control circuit 171 for a set data-ready bit. When one is found, system processor 100 reads the control message stored in the control message register of port circuit 111 and resets the data-ready bit in the status register.

CONTROL SIGNALLING CHANNEL

The general purpose communication interface of this invention makes use of the control signalling channel (S channel) to provide a direct communication link between a computer connected to a set of communication leads and the system processor of the telephone switching system. The computer used for this purpose can, for example, be a personal computer having a floppy disc memory. For the interaction of the personal computer with the system processor to be understood, the port circuit must be examined in detail. To accomplish this, a description is provided of the general purpose port circuit. This description provides an understanding of the typical digital terminal connection to the telephone switching system, upon which foundation the general purpose communication interface description can be constructed.

PORT CIRCUIT, FIGS. 4-6

Figure 4:
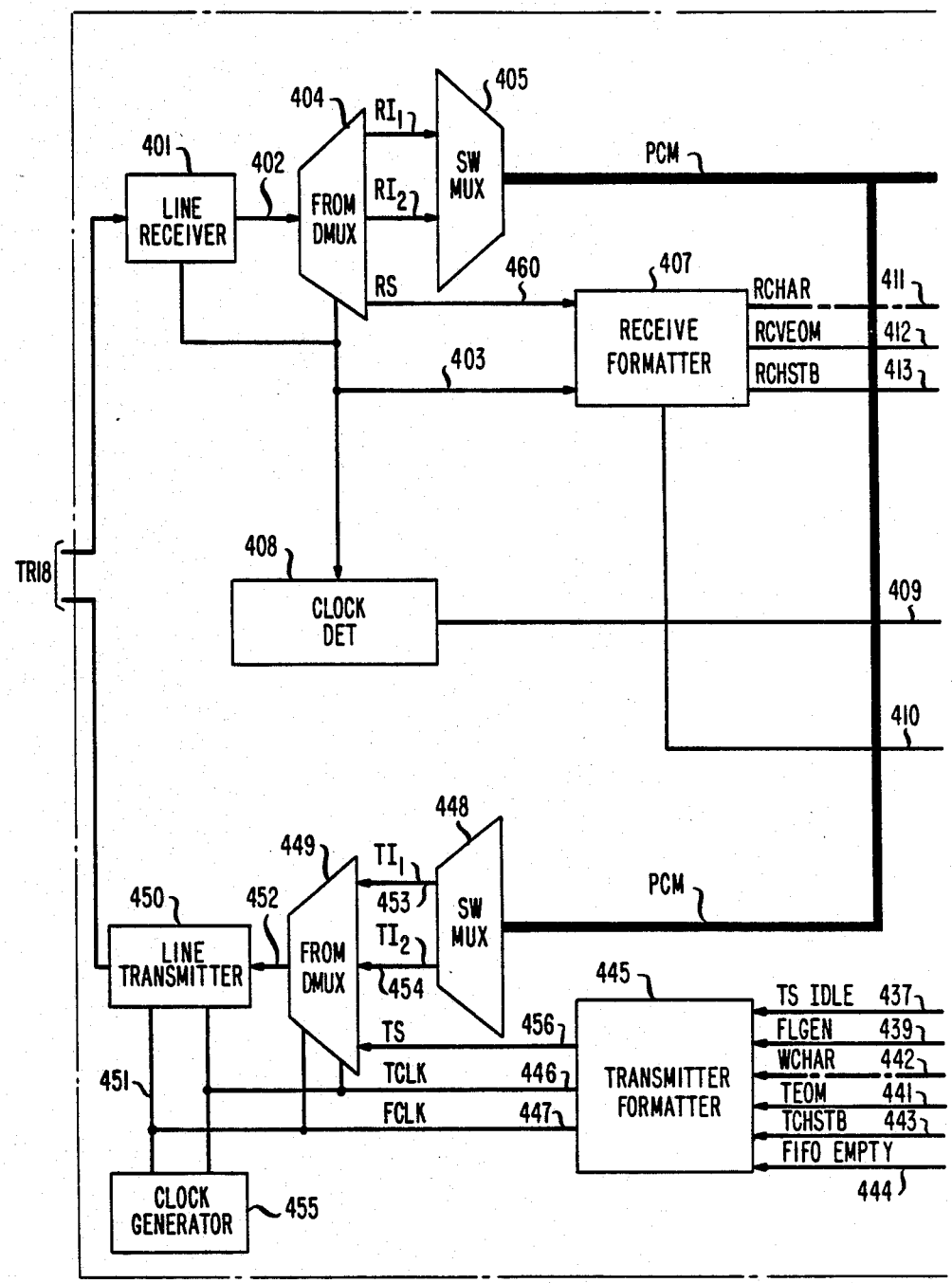
Figure 5:
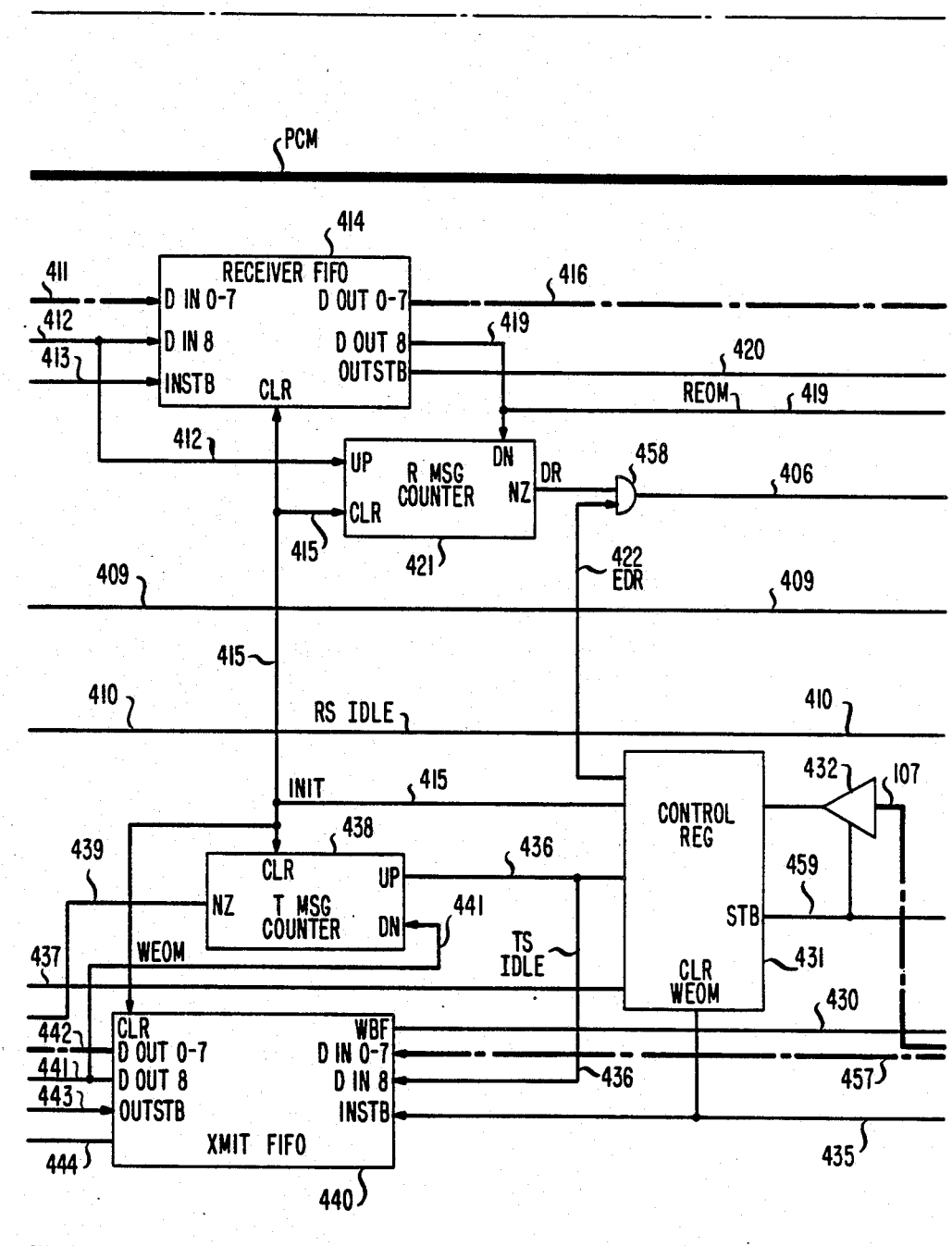

FIGS. 4, 5 and 6, when arranged shown in FIG. 7 disclose details of the port circuit with emphasis upon the port circuitry associated with the reception and generation of S bit signalling messages in the DCP message frame format shown in FIG. 8. Additionally details of this circuit are disclosed in U.S. Pat. No. 4,534,023.

The communication leads TR18 comprises a 160 kilobit per second data link to the associated terminal equipment, computer T18. The 160 kilobit rate results from the fact that message segments of 20 bits (as shown in FIG. 8) are transmitted between computer T18 and port circuit 118 at an 8 Khz rate. Alternate bipolar modulation is used to transmit the data signals.

RECEIVER

The operation of the receiving portion of port circuit 118 is first described. Message segments from computer T18 are received in the DCP frame format and applied over communication leads TR18 to line receiver 401. Line receiver 401 derives its synchronization from the framing bits of each received message segment and passes the remaining fields (the S field and the two I fields) in serial form to frame demultiplexer 404 over lead 402. The synchronization circuitry of line receiver 401 generates a receive clock signal and applies it over lead 403 to the control portion of demultiplexer 404 as well as to receive formatter 407 and clock detector 408.

Line receiver 401 separates the received signal from the noisy environment of the communication leads TR18 and transforms it into a logic level signal that is applied to the input of demultiplexer 404. Demultiplexer 404 demultiplexes the S field and the two I fields. The information in the two I fields comprises the data transmission from computer T18. This data transmission is extended over leads $RI_1$ and $RI_2$ to multiplexer 405 which multiplexes the signals together and places them on time multiplexed bus PCM. Each I field occupies a different time slot on time multiplexed bus PCM and thus the information in each I field is transmitted out sequentially during each occurrence of its associated time slot. This information is applied to the time slot interchange facilities of the system which performs a conventional time slot interchange function and interconnects each I field with the port to which the call is directed. This invention is not concerned with the processing or switching of the I field information and therefore it is not described herein in further detail. The interface from the switch multiplexer 405 to the bus PCM contains both data and clock signals to control the switch multiplexer 405 and the switch demultiplexer 448.

The S field information comprises one bit of the message segment of FIG. 8 and is applied over lead 460 to the receive formatter 407. Lead 460 comprises an eight kilobit per second serial channel carrying the S field information. Receive formatter 407 performs the customary flag detection operation on this signal. That is, it looks for a pattern of a 0, followed by six 1's and a 0, as shown on FIG. 9, and synchronizes to that pattern as long as the flags appear on lead 460. As soon as receive formatter 407 detects a nonflag sequence, as is the case when a signalling message character is received, it begins to perform a serial to parallel conversion on each nonflag byte. During the time when nonflag characters are being received, receive formatter 407 performs a conventional zero delete function whenever it detects a sequence of five 1's followed by a 0. It does this in accordance with the HDLC protocol in order to prevent a message character from being construed as the reception of a flag character. Receive formatter 407, while it is performing this serial to parallel conversion on nonflag characters, also detects the reception of a flag character at the end of each message. It then generates a signal that is applied to lead 412 to specify the end of message for the received character. This path is also termed RCVEOM (Receive End Of Message). Receive formatter 407 applies each character after it is formed into a parallel format to leads 411 and from there to the receiver FIFO 414. Receive formatter 407 also generates a signal that is applied to lead 413 to control the strobing of information into FIFO 414. The signal on lead 413 appears concurrently with the signals on leads 411 and 412 so that they then can be strobed into FIFO 414.

RECEIVER FIFO 414

Receiver FIFO 414 is organized as a 48 word, nine bit per word FIFO. The nine bits in each word are the eight bits representing the received character on leads 411 and a one bit "end of message" signal on lead 412 indicating whether or not each receive character does or does not represent the last character of a message. The characters that are applied to the input of receive FIFO 414 pass through in the conventional manner to the output of receive FIFO 414. These eight bits are applied over leads 416 to tri-state gates 417. The end of message signal associated with each character is applied over lead 419 to counter 421. The end of message signal is present only when the character is indeed the last character of a message and, at that time, the end of message signal increments counter 421 by a count of one.

Tri-state gates 417 are enabled by a read register signal on lead 420. This signal is generated by system processor 100 and applied to port circuit 118 over I/O BUS via port data/control interface circut 171 and leads DATA when system processor 100 wishes to read the contents of FIFO 414. System processor 100 effects this operation by applying a unique address signal over the above described path to address decoder 433 to cause it to generate an output on lead 420 extending to FIFO 414 and gates 417. Each port circuit, including port circuit 118 shown on FIGS. 4, 5 and 6, is assigned a plurality of I/O BUS addresses. The various addresses represent the various functions of which the port circuit is capable. A particular function is initiated by the application of the associated I/O BUS address to decoder 433. Accordingly, in order to read out a character from FIFO 414, system processor 100 applies the port address associated with lead 420 to address decoder 433 via the DATA leads. Address decoder 433 responds to this address, drives lead 420 to cause the character at the output of FIFO 414 to be extended over leads 416 and through gates 417 to leads DATA. This character is then passed through port data/control interface circuit 171 and over I/O BUS to system processor 100 which stores it and every other received character until a complete message is formed.

The read register lead 420 also extends to the OUTSTB terminal of FIFO 414. FIFO 414 responds to the trailing edge of this signal and advances the next character stored within FIFO 414 to the output of FIFO 414 so that it can be read on the next read register operation. Thus, the read register signal on lead 420 performs two functions. The first is to enable gates 417 to pass the character currently on FIFO 414 output over leads 416, through gates 417 to DATA leads. The trailing edge of the read register signal on lead 420 advances the next character within FIFO 414 to the output FIFO 414.

The ninth bit in FIFO 414 is the END OF MESSAGE bit on lead 419. This signal performs two functions. The first function is to provide a READ END OF MESSAGE signal to the input of the status gate 426. Status gate 426 can be read by system processor 100 when it performs a READ STATUS REGISTER function on port circuit 118. Status gate 426 has a unique address and when system processor 100 applies this address to I/O BUS, the address is decoded by decoder 433 which applies an enable signal over lead 429 to activate status gate 426. Status gate 426 applies the signal present on lead 419, to data leads for transmission to system processor 100. The enabling of lead 429 enables all of the status register gates 424 through 428.

The second function of the READ END OF MESSAGE signal bit on lead 419 is to decrement receive messae counter 421. Counter 421 at any time has a count in it that indicates the number of messages currently stored within FIFO 414. Counter 421 is incremented by a RECEIVE END OF MESSAGE signal on lead 412 and is decremented when a READ END OF MESSAGE signal is read out of FIFO 414 on lead 419. Thus, the current count of counter 421 represents the number of complete messages currently stored within FIFO 414. The output of counter 421 on lead DR is the signal which permits a DATA READY indication to be read by system processor 100 as it scans status gates 424–428. The DR signal is extended through gate 458 when lead 422 carries an enables signal and from there the signal extends over lead 406 to the input of the scan register gate 423 and to gate 425.

System processor 100 can read either scan register gate 423 or FIFO 414 by applying the appropriate addresses to I/O BUS. The address for either of these is decoded by decoder 433. The appropriate output of decoder 433 is enabled to activate the appropriate tri-state gate, such as 423 or 417, to allow data to be applied to data leads.

TRANSMITTER

System processor 100 can generate and write messages into port circuit 118 of FIGS. 4, 5 and 6 for transmission to computer T18. It does this by utilizing the write portion of port circuit 118. The first step system processor 100 performs on a port write operation is to determine whether transmit FIFO 440 is full and is able to accept the message. If FIFO 440 is not full, system processor 100 writes the first byte of the message into port circuit 118. System processor 100 performs this function by first applying the appropriate address signal to I/O BUS. The signal that is applied is that which is associated with the write portion of port cicuit 118. Decoder 433 decodes this address and generates the WREG signal on lead 435. This signal enables tri-state gate 434 which allows the message information now on I/O BUS to be extended through gate 434 and over lead 457 to the input of FIFO 440. This signal on lead 435 is also applied to the INSTB input of FIFO 440 to strobe the message information currently on lead 457 into FIFO 440.

Also strobed into FIFO 440 at this time is the ninth bit, a WRITE END OF MESSAGE bit, which is applied to FIFO 440 over lead 436. This signal indicates that the character associated with this bit is the last character of a transmitted message. System processor 100 sequentially writes each character of a message into FIFO 440. Just before the last character of the message is to be input into FIFO 440, system processor 100 writes into control register 431 via gate 432 and lead 459 to generate a WRITE END OF MESSAGE signal on lead 436. This signal is strobed into FIFO 440 at the same time the last byte of the message is strobed via the WREG signal on lead 435. The signal on lead 436 is automatically reset after the last byte is written into FIFO 440 by the trailing edge of the WREG signal on lead 435.

TRANSMIT FIFO 440

Transmit FIFO 440 is organized as a 48 word by nine bits per word FIFO. Eight of the nine bits represent the character information; the ninth bit of each word represents the absence or presence of a WRITE END OF MESSAGE signal. Transmit FIFO 440 has a WRITE BUFFER FULL output termed WBF. When all 48 words in FIFO 440 are filled, the WBF signal is extended over lead 430 to status register gate 427. This gate is periodically read by system processor 100 prior to writing FIFO 440. When FIFO 440 is full, the output of gate 427 advises system processor 100 that FIFO 440 can accept no more bytes for the time being. If FIFO 440 is detected to be full in the middle of writing a message, system processor 100 will queue the remainder of the message and throttle the load until a previously loaded message is transmitted and FIFO 440 becomes sufficiently empty to accept at least one more byte.

The outputs of FIFO 440 are applied to leads 441 and 442. Lead 442 carries eight bits representing character information and lead 441 carries an END OF MESSAGE bit. FIFO 440 receives a strobe signal from transmit formatter 445 over lead 443. The character information on lead 442 and the END OF MESSAGE signal on lead 441 are applied to the input of transmit formatter 445.

TRANSMIT FORMATTER 445

Transmit formatter 445 normally continuously generates and sends out flag characters on the channel to the associated customer station as long as there are no messages in FIFO 440. At such times, transmit formatter 445 sequentially generates a flag character of 0, six 1's and a 0. Whenever FIFO 440 is not empty, transmit formatter 445 begins the process of unloading the characters from FIFO 440 and transmitting them out over the S channel. It does this by performing a parallel to serial conversion on the received characters and the zero insertion function required for transparency. Thus, transmit formatter 445 first sends out flag characters when it determines from transmit FIFO 440 over lead 439 that FIFO 440 is not empty, then, at the end of transmission of the flag character, transmit formatter 445 generates a strobe signal that is applied over lead 443 to FIFO 440. This signal is used internally by transmit formatter 445 to load the character information on lead 442 and any END OF MESSAGE signal on lead 441 into transmit formatter 445. The trailing edge of this strobe signal is also used to advance FIFO 440 to bring the next character in FIFO 440 to the FIFO output.

Transmit formatter 445 performs a parallel to serial conversion on the received information. It also performs a zero insertion function when it is sending nonflag characters out over lead 446. That is, if the transmitted bit stream of the message has five consecutive 1's, transmit formatter 445 inserts a 0 between the fifth-1 and the next bit transmitted. Thus, transmit formatter 445 transmits out each character it receives and it checks the END OF MESSAGE bit associated with each character. When the last character in a message is received from FIFO 440, lead 441 is set to a 1. This tells transmit formatter 445 that this character is the end of a message and causes transmit formatter 445 to insert a flag after this character. Transmit formatter 445 does this and then checks for a transmit empty signal on lead 444. If the empty signal is present, transmit formatter 445 continues to generate and transmit flags. If the empty signal is not present, transmit formatter 445 then reads the next character out of FIFO 440. This new signal is a first character of a subsequent message. Transmit formatter 445 processes any such first characters of the subsequent message, and all other characters of that subsequent message, in a manner similar to that already described.

System processor 100 can write an initialize bit into control register 431. This bit causes FIFOs 414 and 440 to be cleared as well as the message counters 421 and 438. This effectively removes all information from port circuit 118.

Lead 409 interconnects clock detector 408 with status register gate 424. Clock detector 408 normally receives clock pulses on lead 403 from line receiver 401. At such times, clock detector 408 applies a 0 over lead 409 to register gate 424. This permits system processor 100, when reading register gates 424-428, to determine that clock pulses derived from the received data stream are being received over communication pair TR18 by line receiver 401 and applied over lead 403 to detector 408. This is the normal operable state of the system. If, for any reason, line receiver 401 fails to receive a data stream, detector 408 receives no clock pulses and sets lead 409 equal to a 1 to permit system processor 100 to read gate 424 and determine this condition. This condition could exist for example when the associated terminal equipment T18 is disconnected from communication leads TR18.

Lead 422 interconnects the lower input of AND gate 458 with control register 431. This path is normally held in an enabled state by control register. This enables gate 458 and permits the DR output of counter 421 to be extended over lead 406 to scan register gate 423. This DATA READY signal is used to advise system processor 100 that at least a single message is currently contained within receive FIFO 414.

Address decoder 433 contains flip-flops so that when an address is applied to the I/O BUS together with appropriate control signal by system processor 100, these control signals latch the address into the decoder flip-flops. The output of these flip-flops extends to circuitry which decode the address and give output signals unique to each different address. One of these output signals extends to lead 459. This signal is active at the time that data appears on I/O BUS and is used to strobe the data into latches in control register 431. That data is persistent because it is latched into control register 431. Control register 431 contains flip-flops which store the state of port circuit 118 as controlled by system processor 100, as subsequently described.

Transmit message counter 438 functions similarly to receive message counter 421 to indicate whether FIFO 440 currently contains a complete message. Transmit message counter 438 is incremented over lead 436 when a message is entered into FIFO 440. Transmit message counter 438 is decremented over lead 441 when a message is read out of FIFO 440.

The output of transmit formatter 445 extends over lead 456 to the frame multiplexer 449. Switch demultiplexer 448 receives PCM time slot signals on bus PCM, separates out the I1 and I2 field signals for use by port circuit 118 from their assigned time slots and applies them to leads 453 and 454. An output of transmit message counter 438 extends to transmit formatter 445 on lead 439 which indicates when the contents of transmit message counter 438 is 0. This implies that no messages are contained in FIFO 440 and the transmit formatter 445 should generate flag characters.

The I1, I2 signals are received by frame multiplexer 449 together with the serialized S channel bits on lead 456. Once each frame, frame multiplexer 449 inserts the eight bit I1 field, the eight bit I2 field and the one bit S field into a framing signal and applies it over lead 452 to the line transmitter 450 which addes the F field bits. From there, resultant twenty bit frame of FIG. 8 is extended over communication leads TR18 to computer T18.

Line transmitter 450 and frame multiplexer 449 operate under control of the output signals from clock generator 455. Switch demultiplexer 448 receives its control signals from bus PCM.

GENERAL PURPOSE COMMUNICATION INTERFACE—FIG. 2

The subject general purpose communication interface DT18 is connected to communication leads TR18 and functions to establish three communication paths between computer T18 and the telephone switching system. The first communication path is a voice communication channel which extends from a telephone handset 209 associated with computer T18 to the telephone switching network 101. The second communication path is a data communication channel which extends from a connector on the general purpose communication interface to which computer T18 is connected, to the telephone switching network 101. The third communication path is a signalling communication channel which extends from computer T18 to system processor 100 via the S (control signalling) channel of the telephone switching system. These three communication paths are multiplexed on communication leads TR18 in the DCP message frame format of FIG. 8: S (control signalling) channel; I (information) channel, which consists of two sub-channels—I1 for PCM encoded voice and I2 for data. The general purpose communication interface DT18 routes the I2 and S channel signals directly to computer T18 via a pair of RS232 connectors while the I1 channel signals are routed through CODEC 207 to a telephone handset 209 for voice communication. Thus, general purpose communication interface DT18 is totally transparent to messages on the S channel. The general purpose communication interface DT18 simply provides computer T18 with direct access to system processor 100 via the S channel.

Figure 2:
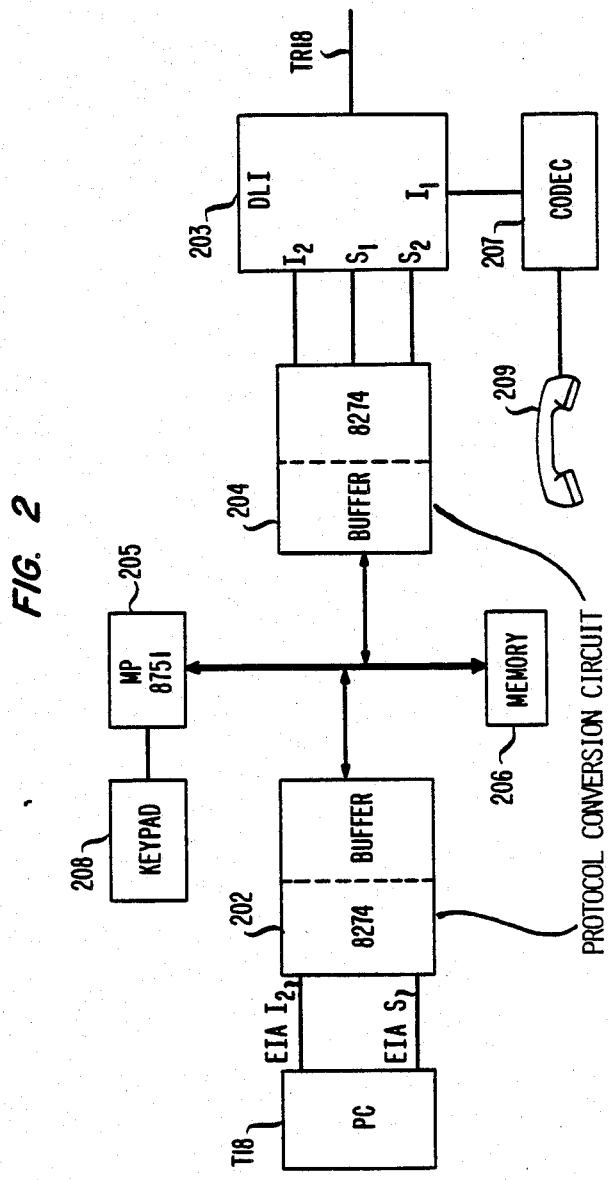
FIG. 2 depicts the details of the general purpose communication interface.

General purpose communication interface DT18 (illustrated in FIG. 2) is a microprocessor controlled circuit which contains a number of interface and protocol conversion devices. Computer T18 generates EIA control, ASCII data and timing signals that are converted by protocol conversion circuit 202 from RS232 signal levels to 5 volt logic signal levels. Protocol conversion circuit 202 also converts the signals received from computer T18 to a message format compatible with microprocessor 205. Protocol conversion circuits 202 and 204 are commercially available devices such as an Intel 8274 Multi-Protocol Serial Controller device. This device is designed to interface high speed communication channels, which carry signals having an IBM Bisync or HDLC protocol, to a microcomputer. In particular, the protocol conversion circuit (202 and 204) interfaces two independent bi-directional serial channels from an attached device, such as computer T18 or DLI 203, to a microcomputer such as microprocessor 205, which is an Intel 8751 microprocessor. The serial channels between DLI 203 and protocol conversion circuit 204 carry signals having a serial protocol (HDLC). Protocol conversion circuit 204 decodes the serial protocol and stores the message contained therein in a receive buffer. Microprocessor 205 receives an interrupt when protocol conversion circuit receives valid data and reads the contents of the receive buffer. When it has messages to transmit, microprocessor 205 writes messages into a transmit buffer in protocol conversion circuit 204 for conversion to HDLC protocol and transmission to switching network 101 through DLI 203 via the serial channels. These messages processed by microprocessor 205 are the one bit S channel and eight bit I channel messages discussed above. Similarly, protocol conversion circuit 202 interfaces the serial EIA RS-232C channels from computer T18 to the general purpose communication interface microprocessor 205.

Program instructions stored in memory 206 handle the state transitions of the HDLC protocol used on the S channel and I2 channel. In fact there are two control sub-channels on the S channel: one control sub-channel corresponding to each I channel. Microprocessor 205 maintains separate protocol state information for each of these S channels (I1 and I2).

Protocol conversion circuit 204 generates idle flags when no data is being received from microcomputer 205. DLI 203 transmits these idle flags to switching network 101 via the I channel (port circuit 118, port data/control interface circuit 171) or S channel. Once computer T18 begins transmitting a data message, protocol conversion circuit 202 formats the received data message and interrupts microcomputer 205 which moves the data message in eight bit increments to a buffer in protocol conversion circuit 204. Protocol conversion circuit 204 converts the message to HDLC format and sends it to DLI 203. Protocol conversion circuit 204 calculates a CRC code on the data message to insure accuracy of transmission.

Digital line interface 203 interconnects general purpose communication interface DT18 with port circuit 118 via communication leads TR18. Digital line interface 203 includes a control circuit (not shown) and a phase locked loop (not shown) which recover the clock signals from the message frames serially transmitted by port circuit 118 to general purpose communication interface DT18 via communication leads TR18. These recovered clock signals are used by digital line interface 203 to both receive message frames from port circuit 118 and generate message frames for serial transmission to port circuit 118.

Digital line interface 203 reads out two eight bit bytes (I1 and I2) at a time of the formatted data message from the data message memory of protocol conversion circuit 204. Similarly, digital line interface 203 reads one bit (S) at a time of the control message stored by microprocessor 205 in protocol conversion circuit 204. Digital line interface 203 combines the two eight bit data bytes (I1 and I2) with the one bit (S) control message to create the message frame of FIG. 8. The resultant message frame is transmitted in serial form by digital line interface 203 to port circuit 118 via communication leads TR18.

Message frames transmitted to general purpose communication interface DT18 by port circuit 118 are received and decoded in reciprocal fashion by the general purpose communication interface DT18. Digital line interface 203 receives message frames serially transmitted by port circuit 118 on communication leads TR18. Digital line interface 203 stores the received eight bit data bytes and control bit in protocol conversion circuit 204. Microprocessor 205 reads the received control message from protocol conversion circuit 204 in eight bit increments and interprets same. If the control message requires that computer T18 be signaled, microprocessor 205 loads the control message into protocol conversion circuit 202. Protocol conversion circuit 202 transmits same to computer T18.

GENERAL PURPOSE COMMUNICATION INTERFACE SOFTWARE—FIG. 3

Figure 3:
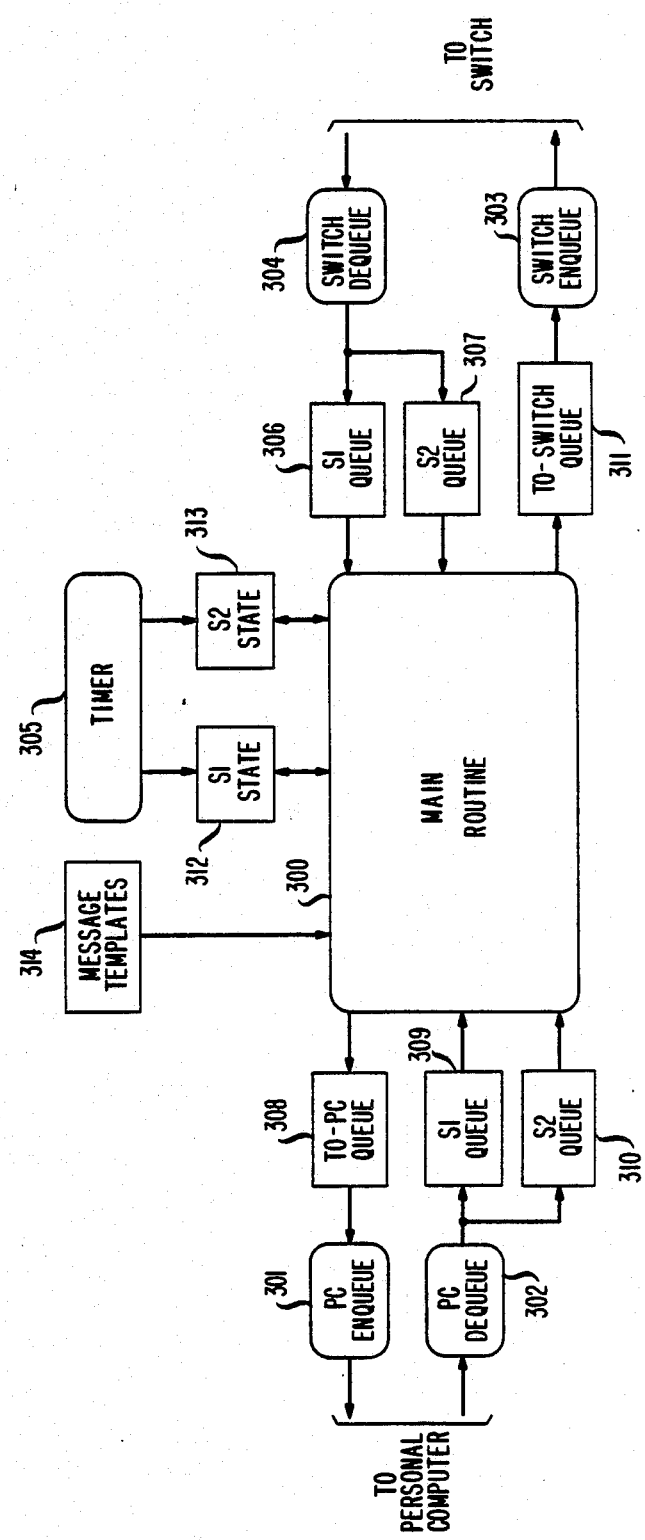
FIG. 3 depicts the details of the firmware which controls the operation of the generate purpose communication interface.

The program instructions or software stored in memory 206 is illustrated in schematic form in FIG. 3 and is disclosed in full detail in Appendix A. These instructions are implemented as statements of the SMAL2 language. As shown in FIG. 3 (as boxes with round corners), there are 6 tasks performed by microprocessor 205:

1. the main routine (300),
2. the computer enqueue handler (301),
3. the computer dequeue handler (302),
4. the switch enqueue handler (303),
5. the switch dequeue handler (304), and
6. the timer (305).

Also, as shown in the figure, there are the following data structures:

1. the S1 and S2 message queues (306, 307) for messages from system processor 100 to computer T18,
2. the TO-PC queue (308) for messages that are routed to computer T18,
3. the S1 and S2 message queues (309, 310) for messages received from computer T18,
4. the TO-SWITCH message queue (311) for messages routed to system processor 100,
5. the protocol state information (312, 313) for the HDLC protocol on each of the S1 and S2 channels, and
6. a collection of templates (314) of all possible messages that can be sent to system processor 100.

Each of the queue handler tasks and the timer task are implemented as interrupt handlers. The timer's (305) job is to decrement a counter for each of the S channels so the main routine can determine if there is a protocol timeout.

The main routine (300) is an infinite loop that continuously checks for work to do. There is work to do if any of the queues that the main routine reads is non-empty. These queues are the S1 and S2 queues (309, 310) from computer T18 and the S1 and S2 queues (306, 307) from system processor 100 which contain messages that originated at computer T18 or at system processor 100, respectively.

The job of the switch enqueue and dequeue tasks (303, 304) is to send and receive S channel messages to and from system processor 100. On receiving S channel message bytes from protocol converter 202, the dequeue task (303) interacts with this Intel 8274 chip to determine when the end of the message arrives. The dequeue task (303) then reads the message itself to determine if the message arrived over the S1 channel or the S2 channel. At this point, the dequeue task (303) prepends the S channel number and the message size to the message. Additionally, microprocessor 205 adjusts the queue writer pointer to allow the main routine (300) to detect that a message is in the queue (306 or 307).

The main routine (300) detects that one of the switch input queues (306, 307) is non-empty. Certain messages are received from the switch exclusively to satisfy the protocol. Appropriate action is taken by the main routine (300) to maintain the protocol if the message is of this type. Other messages are information messages that should be interpreted by computer T18. In this case the main routine (300) will move this message to the TO-PC queue (308) and perform whatever is necessary to satisfy the HDLC protocol used on the particular S channel. Usually this means that an acknowledge message is sent back out to system processor 100 by stuffing a message template with the proper sequence numbers and enqueueing this in the TO-SWITCH queue (311), and then resetting the timeout counter. The PC enqueue task (301) will now enqueue the message and deliver it to computer T18 via protocol converter 202.

The PC dequeue task (302) reads messages from computer T18 via the serial port (protocol converter 202) and dequeues them in much the same way as described earlier for the switch dequeue task (304). Note that in this case there are two formats:
1. a "real" S channel message (S Channel Message Format) which should go to system processor 100, and
2. a command to be interpreted by the general purpose communication interface DT18.

An example, of the general purpose communication interface control message is to tell general purpose communication interface DT18 to transmit a TOUCH-TONE signal on the voice path. This is the mechanism by which dialing is done for voice calls.

If the message is interpreted as a command for general purpose communication interface DT18 it is executed by microprocessor 205, otherwise the message is injected into the TO-SWITCH queue (311). The switch enqueue task (303) will then send it to system processor 100 over the DCP link (communication leads TR18).

The main routine (300) also periodically checks the values of the S1 and S2 channel timeout counters, S1 state and S2 state (312, 313) to determine if there is a protocol timeout. If there is, appropriate action is taken.

General purpose communication interface DT18 thereby implements a direct communication channel between computer T18 and system processor 100. The signalling protocol disparity between computer T18 and system processor 100 is handled by the selection of protocol conversion devices 202, 204 while the transfer of messages between protocol conversion devices 202, 204 is orchestrated by microprocessor 205 operating under control of program instructions stored in memory 206. Microprocessor 205 creates the necessary message queues and coordinates the operation of protocol conversion devices 202, 204. This arrangement accomplishes the elimination of the existing barrier between customer provided computer facilities and the system processor of the telephone switching system.

COMPUTER FACILITY T18

General purpose communication interface DT18 makes system processor 100 available to computer T18. The software resident on computer T18 can be provided by the customer to enhance existing services or provide new services for the telephone switching system. An example of such an arrangement is described in detail below and is disclosed in program form in Appendix B.

Computer T18 can be any general purpose computer and, for the sake of illustration, a Fortune Systems Corp. Model 32:16 is used in the present embodiment. This computer is equipped with a standard UNIX TM operating system and the set of program instructions used to implement the subject invention are illustrated in schematic form in FIG. 10. These instructions are implemented as statements of the C programming language, which statements are listed in Appendix B.

COMPUTER FACILITY SOFTWARE FUNCTIONALITY

The subject invention is the implementation of an integrated attendant console/directory assistance system on computer facility T18 which system operates cooperatively with the telephone switching system to process attendant service requests. Computer facility T18 performs the actual call processing required to serve the attendant service request and signals the telephone switching system to implement the actual call connection. Thus, the telephone switching system is relieved of the burden of processing attendant and directory assistance calls since these are handled by computer facility T18. Also, the directory assistance data base is used by computer facility T18 not only to identify the called party to the attendant but also to generate the actual call connect message for transmission to system processor 100. The implementation of this service is illustrated in block diagram form in FIG. 10.

In a typical telephone switching system, an attendant position consists of an attendant console wired into a special port appearance in the telephone switching network, a computer terminal which is hard-wired to a stand-alone computer system which provides customer directory service, and a pad and pencil for note taking. All three of these components are both physically and logically segregated. The attendant often has to transfer information from one of these components to another to process a request for service. For example, consider the case of an outside caller requesting to talk to an employee in the building served by the telephone switching system. The attendant receives the call on the attendant console and has to enter the called name via the computer terminal keyboard as a query on the customer directory service data base. The computer system responds to this data entry by searching the data base. When the computer system locates the entry corresponding to the called name, it displays the called party's name and number on the computer terminal. The attendant then has to dial that number on the console using either the TOUCH-TONE pad or the direct station select buttons. Once the called party answers, the attendant operates the appropriate buttons on the attendant console to connect calling and called parties. If the called party is busy, the attendant has to record the calling party's name, the attendant console switched loop appearance on which the calling party appears and the called party's name and number. This recorded information is later used by the attendant to complete the call when the called party goes on-hook.

The subject attendant call processing arrangement physically and logically integrates these various functions. In most cases, the transfer of data between one logical device and another can be done automatically by software in the computer facility without requiring the attendant's intervention. This is accomplished by the use of the communication channel between computer facility T18 and system processor 100 wherein general purpose communication interface DT18 passes the signalling channel messages between system processor 100 and the call processing software which runs on computer facility T18.

COMPUTER FACILITY ADMINISTRATION

As has been discussed, computer facility T18 can be connected via general purpose communication interface DT18 to any port circuit in the telephone switching system. The administration of this arrangement is obviously dependent on the structure of the telephone switching system facilities management apparatus. A typical facilities management arrangement (assumed to be implemented on the subject telephone switching system) requires that system processor be programmed to interface with a specified variety of terminal equipment. When one such piece of terminal equipment is connected to a port circuit in the telephone switching system, a user known as the system administrator signals system processor 100 of such an interconnection via a facilities administration terminal. This operation activates service to the associated port circuit and system processor 100 can communicate with the connected terminal equipment by using the message set defined for the identified type of terminal equipment.

If a new variety of terminal equipment is to be connected to a port circuit, system processor 100 must be programmed to communicate with this terminal equipment. The programming includes creating a message set which enables the terminal equipment and system processor 100 to efficiently communicate over the control signalling channel so that the terminal equipment can perform the functions for which it was designed. In the subject arrangement, for the sake of simplicity, the message set associated with computer facility T18 is implemented such that computer facility T18 appears to system processor 100 like a standard multi-button electronic telephone station set terminating a DCP link from a standard port circuit.

Thus, from a message communication standpoint general purpose communication interface DT18 with its associated computer facility T18 and voice communication instrument 209 appears to system processor 100 as a standard multi-button electronic telephone station set. From a call processing standpoint, all attendant service requests are forwarded to computer facility T18. This entails establishing a voice communication connection from the requesting party to voice communication handset 209 and transmitting call related data to the attendant call processing subroutines on computer facility T18 via the control signalling channel.

Computer facility T18 is programmed with the attendant call processing software which is normally located in system processor 100. In addition, the directory assistance data base and service software are stored on computer facility T18. Thus, all the attendant service/directory assistance data and software reside in a single location: computer facility T18. System processor 100 transmits call related data to computer facility T18 on an attendant service request and receives back from computer facility T18 switching system operation signals which indicate the operation necessary to serve the received request.

COMPUTER FACILITY SOFTWARE STRUCTURE

Figure 10:
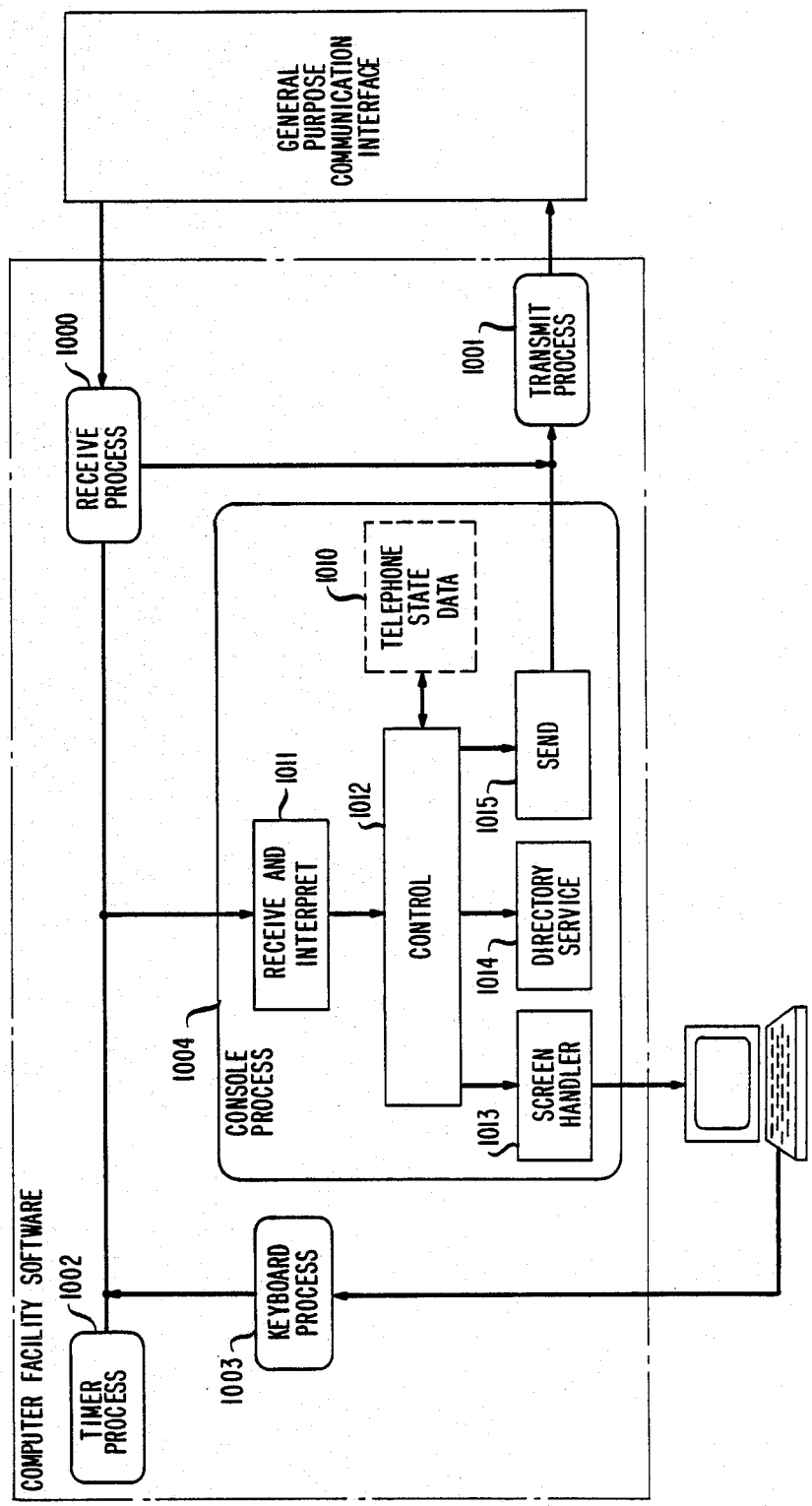
FIG. 10 depicts the details of the software which controls the operation of the computer facility.

As shown in FIG. 10, there are five UNIX processes implemented in the software running on computer facility T18 to implement the attendant call processing arrangement. These five processes are:
(1) the receive process (1000);
(2) the transmit process (1001);
(3) the timer process (1002);
(4) the keyboard process (1003); and
(5) the console process (1004).

Each process can be thought of as a stand-alone C program. The software on computer facility T18 reads standard input and writes standard output and interprocess communication is accomplished through the communication device on UNIX known as pipes. In this system, there are three sources of messages:

(1) the timer process (1002) which generates clock signals;

(2) the keyboard process (1003) which generates user commands that were typed in at the keyboard; and (3) the receive process (1000) which translates messages arriving from system processor 100. Each of these processes prepends a code to each message which identifies itself.

THE RECEIVE AND TRANSMIT PROCESSES (1000, 1001)

The receive process (1000) reads the UNIX pipe that is associated with the serial port connected to general purpose communication interface DT18. The receive process (1000) interprets all signalling messages which arrive from system processor 100 and translates these signalling messages into a standard message set with a functional meaning that is used for all interprocess communication. The receive process (1000) can write into two pipes, one of which terminates on the transmit process (1001) and the other of which terminates on the console process (1004). The use of the two pipes are for the two types of messages which arrive from system processor 100: inquiry messages and command messages. An inquiry message is routed from the receive process (1000) to the transmit process (1001) where the transmit process (1001) generates a response for system processor 100 based on the data stored in the transmit process (1001) concerning the status of the associated keyboard and "attendant console".

TIMER

The timer process (1002) is a clock generation arrangement which periodically sends the date and time-of-day signals to the console process (1004). In addition, the timer process (1002) transmits clock signals to the console process (1004) to indicate that calls on hold should be checked to see if they can be completed.

THE KEYBOARD PROCESS (1003)

The keyboard process (1003) is an endless routine which scans the keyboard and reads characters from a UNIX pipe associated with the keyboard. These characters can be cursor controlled, ASCII characters, carriage return or special function sequences that represent specific actions. The keyboard process (1003) takes the received characters, packages them up into a message and sends the resultant message on to the console process (1004).

THE CONSOLE PROCESS (1004)

The console process (1004) performs several functions and contains most of the intelligence in this particular software. The functions of the console process (1004) are: maintaining a data base which represents the state of the telephone (1010), managing the windows on the CRT (1013), performing the customer directory look-up (1014), and controlling the overall software activity (1014) to implement the attendant call processing function.

The first task listed above involves creating a data base using a template of a multi-button electronic telephone station set which is used as the "pseudo attendant console" to indicate the state of the telephone associated with the attendant service. This data base (1010) is updated as messages from system processor 100 indicate changes in the lamp and ringer status of the telephone station set. It is through this data base that the software is able to determine which line appearances are ringing, on hold, etc.

CRT DISPLAY

The human interface of computer facility T18 is by way of windows which appear on the CRT screen of computer facility T18. As shown in FIG. 11, there are five windows used to implement the attendant console/directory function. These windows are: a customer directory service window (1101) for looking-up the extension of a called party, a time-of-day and date window (1102), a speed call window (1103) from which the attendant can select preprogrammed telephone numbers, a window (1104) displaying called party status, and an input window (1105).

The display shown in FIG. 11 includes a time-of-day window (1102) which indicates the actual time as well as any error messages to the attendant. The directory service window (1101) is a field used for performing directory look-ups. The attendant would operate this particular function by moving the cursor (1106) on the CRT screen to the next available line in the directory service window (1101) and typing in the name of the called party. The keyboard process (1003) receives the cursor movement and keystroke signals and transmits these signals to the software in the attendant console process (1004). The console process (1004) accesses the directory service data base (1014) contained in the console process (1004) to obtain information as to the extension, room number and department of the called party. The console process (1004) transmits this data (via screen handler 1013) to the CRT which displays same to the right of the name of the called party entered by the attendant.

A speed calling window (1103) on the CRT displays a list of frequently called names, services or locations. Calls can be forwarded from the attendant console to any of these preprogrammed numbers with a single keystroke. This is accomplished by the attendant moving the cursor (1106) on the CRT next to the desired destination indication and operating the ACTION key (not shown) on the keyboard. The keyboard process (1003) receives both the cursor movement and keystroke signals and transmits these signals to the console process (1004). The console process (1004) translates these received signals into a request for access to the particular identified destination. The telephone number of this destination is obtained from a speed call table stored in telephone state data (1010) in the console process (1004). The console process (1004) creates a dialing message containing this number and transmits same to system processor 100 via the transmit process (1001), general purpose communication interface DT18 and the signalling channel. System processor 100 receives the dialing message, which is of the same format as a dialing message from a standard telephone station set, and establishes a switching network connection between the station set 209 associated with computer facility T18 and the identified destination.

The appearance status window (1104) displays up-to-date information about the line appearances which terminate on this attendant console. The columns shown on FIG. 11 are: CALLING, for calling party identification; CALLED, called party identification; EXT, for the number of the called party; STATUS, for the call status of the particular line appearance; and TIME, for the length of the time that the call has been in this particular status.

INCOMING CALL EXAMPLE

An example of how the appearance status window (1104) is used is given in the following description of the arrival of an incoming call on an outside trunk. When the incoming call is detected by the telephone switching system, system processor 100 generates an incoming call message which is transmitted through the communication channel, general purpose communication interface DT18, computer facility receive process (1000) to the computer facility console process (1004). The console process (1004) receives the message and generates a status indication for the line associated with the incoming call and changes the status indication on the CRT appearance status window from "idle" to "ringing". In the CALLING column on the appearance status window (1104), the calling party is identified as "outside" and the TIME column starts displaying the elapsed time that this incoming call has remained in the ring state. The console process (1004) uses the clock signals from timer process (1002) to generate a beep on the CRT each five seconds to alert the attendant. The attendant answers this call by positioning the cursor (1106) on the CRT over the ringing line appearance and operating the ACTION key on the keyboard. The keyboard process (1003) receives both the cursor movement and keystroke signals and transmits these signals to the console process (1004). The console process (1004) translates these received signals into a request for connection to the ringing line. The line number of the ringing line is obtained from the console process data base stored in telephone state data (1010) by using the template stored therein to identify the line associated with the cursor location.

The line number is then mapped into an appearance number. The console process (1004) generates an off-hook message for this appearance number which identifies the ringing line and transmits this message to system processor 100 via the transmit process (1001), general purpose communication interface DT18 and the signalling channel. System processor 100 responds to this standard off-hook line message by establishing a switching network connection between the calling party and the identified off-hook telephone station set.

The attendant is now directly connected to the calling party and asks the caller for his/her name. The attendant moves the cursor (1106) next to this line appearance indication on the CRT and types the calling party's name over the "outside" indication that currently occupies the CALLING field. The attendant then asks the caller to whom the call should be placed and uses the directory service window (1101) to lookup the number of the called party. This is accomplished by the attendant moving the cursor (1106) on the CRT to the directory service window (1101) and typing the name of the called party on the terminal keyboard. Again, the keyboard process (1003) receives both the cursor movement and keystroke signals and transmits these signals to the console process (1004). The console process (1004) translates these received signals via the stored attendant console template stored in telephone state data (1010) and determines that a directory service request has been input. The console process (1004) uses the name of the called party to obtain the requested called party data from the directory service data base (1014). The console process (1004) completes the directory service window (1101) entry by displaying the extension, location, department number, and busy/idle status of the called party on the CRT screen next to the name of the called party.

This call can be transferred to the called party by the attendant operating the ACTION key on the terminal keyboard. The keyboard process (1003) receives the keyboard signal and transmits this signal to the console process (1004). The console process (1004) recognizes the cursor location and the sequence of operation just described as a request to transfer the calling party to the extension identified by the directory service routine. The console process (1004) generates (1012) a call transfer request message and transmits (1015) same via the transmit process (1001), general purpose communication interface DT18 and the control signalling channel to system processor 100. System processor 100 responds to this message by transferring the identified calling party to the extension identified in this message.

While a specific embodiment of the invention has been disclosed, variations in structural detail, within the scope of the appended claims, are possible and are contemplated. There is no intention of limitation to what is contained in the abstract or the exact disclosure as herein presented. the above-described arrangements are only illustrative of the application of the principles of the invention. Normally, other arrangements may be devised by those skilled in the art without departing from the spirit and the scope of the invention.

What is claimed is:

1. A method of providing call processing srevice in a switching system which serves both a plurality of terminal equipment each of which is connected by an associated port circuit to a switching network of said switching system, and a computer facility connected by an associated port circuit to said switching network, which switching network is controlled by a system processor and wherein a control signalling channel connects said system processor with said port circuits, the method comprising the steps of:
   receiving in said system processor a predefined call processing service request from a requesting one of said terminal equipment;
   transmitting call related data associated with said call processing service request from said system processor to said computer facility via said control signalling channel; and
   processing said call processing service request in said computer facility.

2. The method of claim 1 including the step of:
   establishing a voice communication connection from said requesting equipment via said switching network to a voice communication instrument associated with said computer facility.

3. The method of claims 1 or 2 wherein the step of processing includes:
   inputting service request data into said computer facility relating to said call processing service request by a user at said computer facility via a keyboard associated with said computer facility; and
   executing call processing operations on both said service request data and said call related data.

4. The method of claim 3 wherein the step of executing includes:
   generating control data to activate said switching network to implement said call processing service request.

5. The method of claim 4 wherein the step of processing includes:
   transmitting a control message containing said control data from said computer facility to said system processor via said control signalling channel to activate said switching network.

6. The method of claim 5 including the step of:
   establishing a communication connection through said switching network from said requesting equipment to a destination identified by said control message.

7. In a switching system which serves a plurality of terminal equipment, each of which is connected by an associated port circuit to a switching network of said switching system, which switching network establishes network connections among said terminal equipment by interconnecting said associated port circuits, an adjunct call processing arrangement comprising:
   system processor means connected to said switching network for controlling the interconnection of said port circuits by said switching network;
   control signalling means connected to and interconnecting said system processor means and said port circuits for exchanging control signals therebetween;
   computer facility means for executing a predefined set of call processing routines;
   interface means connected to and interconnecting said computer facility means and said control signalling means;
   wherein said system processor means is responsive to a predefined service request from any of said terminal equipment for transmitting a call record identifying said service request and said requesting terminal equipment to said computer facility means via said control signalling means and said interface means; and
   wherein said computer facility means is responsive to said call record for executing one or more of said call processing routines to provide said requested service to said requesting terminal equipment.

8. The system of claim 7 including:
   wherein said computer facility means in executing said call processing routines transmits a call connect message, indicative of the switching system operation required to provide said requested service, to said system processor means via said interface means and said control signalling means; and wherein said system processor means is responsive to said call connect message for controlling the establishment of a switching network connection from said requesting terminal equipment to a destination identified by said executing means.

9. A method of providing attendant services in a switching system which serves both a plurality of terminal equipment each of which is connected by an associated port circuit to a switching network of said switching system, and a computer facility connected by an associated port circuit to said switching network which switching network is controlled by a system processor and wherein a control signalling channel connects said system processor with said port circuits, the method comprising the steps of:

receiving in said system processor an attendant call processing service request from a requesting one of said terminal equipment;

transmitting attendant call related data associated with said attendant call processing service request to said computer facility from said system processor via said control signalling channel and said port circuit associated with said computer facility;

establishing a switching network connection from said requesting terminal equipment to a voice communication instrument associated with said computer facility and operated by an attendant; and processing said attendant call processing service request using said computer facility.

10. The method of claim 9 wherein the step of processing includes:

inputting service request data received by said attendant from said requesting terminal equipment via said voice communication instrument to said computer facility.

11. The method of claim 10 wherein the step of processing includes:

executing call processing operations in said computer facility on said service request data and said attendant call related data.

12. The method of claim 12 wherein the step of processing includes:

generating control data in said computer facility to operate said switching network to complete the requested attendant service; and transmitting a control message containing said control data from said computer facility to said system processor via said control signalling channel.

13. The method of claim 12 including:

transferring said requesting terminal equipment to a switching network connection to a destination identified by said control message.

* * * * *